(12) United States Patent
Kimura

(10) Patent No.: US 6,915,879 B2
(45) Date of Patent: Jul. 12, 2005

(54) MAIN SHAFT BALANCING DEVICE FOR MACHINE TOOL

(75) Inventor: Seiji Kimura, Itami (JP)

(73) Assignee: Pascal Engineering Corporation, Hyogo (JP)

(*) Notice: Subject to any disclaimer, the term of this patent is extended or adjusted under 35 U.S.C. 154(b) by 110 days.

(21) Appl. No.: 10/130,636
(22) PCT Filed: Sep. 17, 2001
(86) PCT No.: PCT/JP01/08081
§ 371 (c)(1),
(2), (4) Date: Sep. 3, 2002
(87) PCT Pub. No.: WO02/22306
PCT Pub. Date: Mar. 21, 2002

(65) Prior Publication Data
US 2003/0075386 A1 Apr. 24, 2003

(30) Foreign Application Priority Data
Sep. 18, 2000 (JP) .................... 2000-281303

(51) Int. Cl.⁷ .................................. F16N 1/00
(52) U.S. Cl. .................... 184/6.14; 184/24; 184/5; 92/168 R; 267/119; 267/130
(58) Field of Search ............... 74/573 F; 184/5, 184/6.14, 24; 267/64.11, 119, 130; 92/153, 156, 168 R

(56) References Cited

U.S. PATENT DOCUMENTS

| | | | | |
|---|---|---|---|---|
| 345,041 A | * | 7/1886 | Fixary .................. | 384/130 |
| 2,689,626 A | * | 9/1954 | Peters .................. | 184/24 |
| 2,819,061 A | * | 1/1958 | Platou .................. | 267/119 |
| 5,305,854 A | * | 4/1994 | Wheeler ................ | 184/24 |
| 5,400,871 A | * | 3/1995 | von Sikorski et al. .... | 184/5 |
| 5,465,811 A | * | 11/1995 | Katz .................... | 184/24 |

FOREIGN PATENT DOCUMENTS

| JP | 0454614 | 5/1992 |
|---|---|---|
| JP | 6297217 | 10/1994 |
| JP | 0071346 | 1/1995 |
| JP | 1054435 | 2/1998 |
| JP | 1105256 | 4/2001 |

OTHER PUBLICATIONS

Copy of International Search Report for PCT/JP01/08081.

* cited by examiner

Primary Examiner—Chong H. Kim
(74) Attorney, Agent, or Firm—Darby & Darby

(57) ABSTRACT

A gas spring comprising a cylinder body filled with compressed gas and an upright rod passing through a rod side end wall member of the cylinder body. By supporting a main shaft unit with the gas spring, the load on a vertical displacement mechanism is reduced. A pair of upper and lower ring-shaped seal members, which seal between the rod end wall member and the rod, are provided inside the rod wall member. Ring-shaped oil filling chambers are formed in between the ring-shaped seal members and between the rod end wall member and the rod. An oil filling mechanism fills the oil filling chambers with lubrication oil.

7 Claims, 6 Drawing Sheets

MAIN SHAFT BALANCING DEVICE FOR MACHINE TOOL

BACKGROUND TO THE PRESENT INVENTION

1. Field of the Invention

The present invention relates to a main shaft balancing device for a machine tool. In particular, the present invention relates to a main shaft balancing device that supports a main shaft unit with an upright gas spring and that can reduce the load on a means for raising and lowering (vertical displacement) of the main shaft unit.

2. Description of the Related Art

In the related art, machine tools such as machining centers and the like are provided with a main shaft unit comprising a shaft for attaching a tool and an electric motor for rotating this shaft. This main shaft unit is raised and lowered by being supported by a vertical displacement mechanism. This type of vertical displacement mechanism usually comprises a vertical ball screw shaft, a ball screw nut which screws onto the ball screw shaft and is connected to the main shaft unit, and an electric motor. By rotating the ball screw shaft with the electric motor, the main shaft unit is raised and lowered together with the ball screw nut.

However, with this type of machine tool, the heavy main shaft unit must be raised and lowered while being supported by the vertical displacement mechanism. Therefore, there is a risk of having a large load on the vertical displacement mechanism and having a lower precision for the vertical position of the main shaft unit. It is also difficult to increase the speed for raising and lowering of the main shaft unit. In addition, the vertical displacement mechanism which supports the heavy shaft unit becomes large, and the manufacturing costs become high.

A main shaft balancing device has been used to lighten the load on the vertical displacement mechanism of the machine tool. For example, in Japanese Laid-Open Patent No. 6-297217, there is disclosed a main shaft balancing device, comprising: a hydraulic cylinder that is affixed to the upper side of a main shaft unit and has a piston rod extending downwards and has the rod end connecting to the main shaft unit; a directional control valve that is connected to a double oil chamber that is separated by the piston of the hydraulic cylinder; a hydraulic pressure supplying mechanism that supplies hydraulic pressure to the hydraulic cylinder via the directional control valve; and a control device that controls the directional control valve.

With this main shaft balancing device, when raising and lowering the main shaft unit by the vertical displacement mechanism, the piston rod of the hydraulic cylinder extends and contracts in synchrony with the raising and lowering of the main shaft unit. Due to the hydraulic cylinder, an upward force approximately equal to the weight of the main shaft unit is generated, and this can lighten the load on the vertical displacement mechanism. When working a workpiece, when the main shaft unit requires a downward pushing force, the main shaft unit is lowered by the hydraulic cylinder, and the downward pushing force is generated by this driving force.

The present applicant has proposed using a gas spring as the main shaft balancing device. In general, a gas spring has a cylinder body that is filled with compressed gas and a rod that passes through a wall member on the rod side end (rod side end wall member) of the cylinder body. However, because the compressed gas inside the cylinder body gradually leaks out and the gas pressure becomes reduced, compressed gas inside the cylinder body must be periodically replenished.

In order to suppress the leakage of compressed gas inside the cylinder body, a seal structure that seals between the end wall member on the rod side of the cylinder body and the rod that passes through this wall member is particularly important. However, the seal structure of the gas spring of the prior art consisted only of a structure in which there is one or a plurality of ring-shaped seal members provided between the rod side end wall member and the rod. As a result, it is difficult to effectively suppress leakage of compressed gas inside the cylinder body.

With the machine tool of the prior art, as described above, ones without a main shaft balancing device must raise and lower the heavy main shaft unit by the vertical displacement mechanism. As a result, the load on the vertical displacement mechanism is large, and the positional precision in the vertical direction of the main shaft unit by the vertical displacement mechanism, or in other words the machining precision, is reduced. It is difficult to increase the speed for raising and lowering the main shaft unit. The vertical displacement mechanism that supports the heavy main shaft unit becomes large, and manufacturing costs are high.

With the main shaft balancing device of Japanese Laid-Open Patent Publication No. 6-297217, when raising and lowering the main shaft unit with the vertical displacement mechanism, it is difficult to control the directional control valve with the control device such that an upward force that is approximately equal to the weight of the main shaft unit is generated by the hydraulic cylinder. As a result, the main shaft unit is limited by the hydraulic cylinder, and raising and lowering at high speeds is difficult. Because a directional control valve and a hydraulic pressure supplying mechanism and a control device and the like must be provided in addition to the hydraulic cylinder, the structure is complex, and the manufacturing costs are high.

On the other hand, when a gas spring is used as the main shaft balancing device as proposed by the present inventor, in order to support an especially heavy main shaft unit, the gas pressure of the compressed gas inside the cylinder body may be set very high. In this situation, as described above, with only ring-shaped sealing members for the seal structure that seals between the rod side end wall member of the cylinder body and the rod of the gas spring, it is difficult to prevent with certainty the leakage of compressed gas inside the cylinder body.

For example, on the surface of the rod of the gas spring, there may be polishing scratches or scratches from foreign objects or there maybe embedding of foreign objects. In these situations, when the vertical displacement of the main shaft unit is stopped or in other words when the extension and contraction of the rod is stopped, if the position of the scratches or foreign objects coincides with the position of the ring-shaped seal member, the compressed gas inside the cylinder body may leak to the outside through the spaces formed by these scratches or foreign objects. In this manner, with the main shaft balancing device using a gas spring of the prior art, it is difficult to ensure a tight seal between the rod side end wall member of the cylinder body and the rod.

Furthermore, with the main shaft balancing device using the gas spring of the prior art, it is difficult to supply lubricating oil to between the rod side end wall member of the cylinder body and rod or to the ring-shaped seal members. As a result, it is difficult to have good lubrication in the sliding parts between the rod end wall member with the ring-shaped seal member and the rod, and there can be abrasion of these members. When there is abrasion of these members, leakage of the compressed gas inside the cylinder body from between the rod end wall member and the rod occurs more readily.

OBJECTS AND SUMMARY OF THE INVENTION

It is an object of the present invention to provide a main shaft balancing device for a machine tool which overcomes the detriments of the related art described above.

It is another object of the present invention to provide a main shaft balancing device for a machine tool wherein the invention uses a gas spring in order to have reliable and effective lightening of a load on a vertical displacement means which raises and lowers a main shaft unit.

It is another object of the present invention to provide a main shaft balancing device for a machine tool which has an improved seal between a rod end wall member of a cylinder body the rod of the gas spring.

It is another object of the present invention to provide a main shaft balancing device for a machine tool which provides good lubrication of the sliding parts of the rod side end wall member and ring-shaped seal member and rod and also improves the durability of these members.

Briefly stated, the present invention relates to a main shaft balancing device for a machine tool provides reliable and effective reduction of the load on a vertical displacement means during raising and lowering of a main shaft unit. A gas spring, has a cylinder body filled with compressed gas and a rod passing through a rod side end wall member of an upright cylinder body. A pair of upper and lower ring-shaped seal members, seal between rod end wall member and rod, inside the rod end wall member. Ring-shaped oil filling chambers are formed in between the ring-shaped seal members and between the rod end wall member and the rod. An oil filling mechanism fills the oil filling chambers with lubrication oil L The present invention is a main shaft balancing device for a machine tool in which a main shaft unit has a main shaft for attaching a tool and an electric motor for rotating the main shaft and is raised and lowered by vertical displacement means, comprising: a gas spring comprising a cylinder body filled with compressed gas and a rod that passes through a rod side end wall member of the cylinder body; the gas spring, which supports the main shaft unit and lightens the load on the vertical displacement means, being provided in a vertical position; a pair of upper and lower ring-shaped seal members, which seal between the rod end wall member and the rod, provided in the interior of the rod side end wall member, a ring-shaped oil filling chamber formed between the ring-shaped seal members and between the rod side end wall member and the rod; and oil filling means for filling oil in the oil filling chamber with lubrication oil.

In this main shaft balancing device for a machine tool, by having a gas spring that extends and contracts, the main shaft unit is supported while having freedom in the vertical displacement of the main shaft unit. Even while the main shaft unit is being raised or lowered, the main shaft unit is effectively supported by the gas spring by generating an upward force on the main shaft unit that is approximately equal to the weight of the main shaft unit. In other words, the load on the vertical displacement means is reliably and effectively lightened. The positional precision in the vertical direction of the main shaft unit due to the vertical displacement means, or in other words the machine working precision, is improved. Because of the lightening of the load on the vertical displacement means, the vertical displacement speed of the main shaft unit can be made even faster.

A pair of upper and lower ring-shaped seal members, which seal between the rod side end wall member and the rod, is provided in the interior of the rod end wall member. A ring-shaped oil filling chamber is formed between the ring-shaped seal members and between the rod end wall member and the rod. Lubrication oil is filled in the oil filling chamber by an oil filling means. The seal between the rod end wall member of the cylinder body and the rod is improved by the pair of ring-shaped seal members and the oil filling chamber.

For example, on the surface of the rod of the gas spring, there may be polishing scratches or scratches from foreign objects or there may be embedding of foreign objects. Even in these situations, because of the pair of upper and lower ring-shaped seal members, there is a double seal in the axial direction between the rod side end wall member and the rod. Furthermore, there is a sealing effect by the lubrication oil that fills the oil filling chamber between the pair of ring-shaped seal members. As a result, even when the position of the scratches or foreign objects coincides with the position of the ring-shaped seal member, leakage of the compressed gas inside the cylinder body to the exterior via spaces formed from these scratches or foreign objects is reliably prevented.

When the oil filling means is provided with an oil tank for storing lubrication oil and an oil path that connects the oil tank to the oil filling chamber, because of the oil tank and the oil path of this oil filling means, the oil filling chamber is reliably filled with lubrication oil.

The oil filling means is constructed so that the main shaft unit can be raised and lowered while the oil tank is connected to the oil filling chamber via the oil path. With this, the cumbersome task of filling with lubrication oil is simplified, and the oil filling chamber is always filled with lubrication oil. Therefore, the sealing and lubricating function of the lubrication oil in the oil filling chamber is reliably achieved.

When the oil filling means is provided with a pressurizing means for pressurizing the lubrication oil inside the oil tank via compressed air, the lubrication oil inside the oil tank is pressurized via the compressed air by the pressurizing means, and this pressurized lubrication oil is supplied to the oil filling chamber via the oil path.

When a discharge path, which is connected to the oil filling chamber and is for discharging of gas inside the oil filling chamber, is provided, and lubrication oil discharged from the oil filling chamber passes through the discharge path and flows back to the oil tank, gas inside the oil filling chamber is discharged from the discharge path and the oil filling chamber is reliably filled with lubrication oil.

The lubrication oil that is discharged from the oil filling chamber and passed through the discharge path flows back to the oil tank, and this lubrication oil is reused. The amount of lubrication oil discharged from the oil filling chamber is automatically supplied to the oil filling chamber from the oil tank via the oil path.

When a discharge path, which is connected to the oil filling chamber and is for discharging of gas inside the oil filling chamber, and a discharge tank, which is for storing lubrication oil that is discharged from the oil filling chamber and is passed through the discharge path, are provided, the gas inside the oil filling chamber is discharged from the discharge path, and the oil filling chamber is reliably filled with lubrication oil.

The lubrication oil that passes through the discharge path to be discharged from the oil filling chamber is stored in the discharge tank. The lubrication oil in the amount that is discharged is automatically supplied to the oil filling chamber from the oil tank via the oil path. The lubrication oil stored in the discharge tank can also be reused.

When the oil filling means is provided with an oil tank for storing lubrication oil and an oil path that connects this oil tank to the oil filling chamber, the oil filling means can also have a hydraulic pump that pressurizes the lubrication oil inside the oil tank and supplies the lubrication oil to the oil filling chamber; and a discharge path, which is connected to the oil filling chamber and is for discharging lubrication oil and gas inside the oil filling chamber into the oil tank, can also be provided.

In this situation, lubrication oil inside the oil tank is pressurized and supplied to the oil filling chamber by the hydraulic pump. Lubrication oil in the amount supplied to the oil filling chamber is discharged from the oil filling chamber to the oil tank via the discharge path. In other words, the lubrication oil is forcibly circulated by the hydraulic pump. As a result, with this lubrication oil, the cooling function of cooling the gas spring is improved. By discharging gas inside the oil filling chamber from the discharge path, there is reliable filling of lubrication oil into the oil filling chamber.

An arrangement in which the cylinder body is affixed to the main shaft unit, and the rod extends downward from the cylinder body is also possible.

When a lower part inside the cylinder body is filled with lubrication oil for sealing of the compressed gas, due to the lubrication oil that fills the lower part inside the cylinder body, the leakage of compressed gas from between the rod end wall member of the cylinder body and the rod is suppressed with even greater reliability. In addition, the sliding parts of the rod end wall member and the rod are lubricated, and gas leakage due to their abrasion is prevented with reliability. Because the cylinder body is arranged in an inverted condition on the main shaft unit, at least the lower end of the inner space of the cylinder body is filled with lubrication oil without needing any special construction.

The above, and other objects, features and advantages of the present invention will become apparent from the following description read in conjunction with the accompanying drawings, in which like reference numerals designate the same elements.

PREFERRED EMBODIMENTS OF THE INVENTION

Referring to the figures, the embodiments of the present invention are described below.

Figure 1:
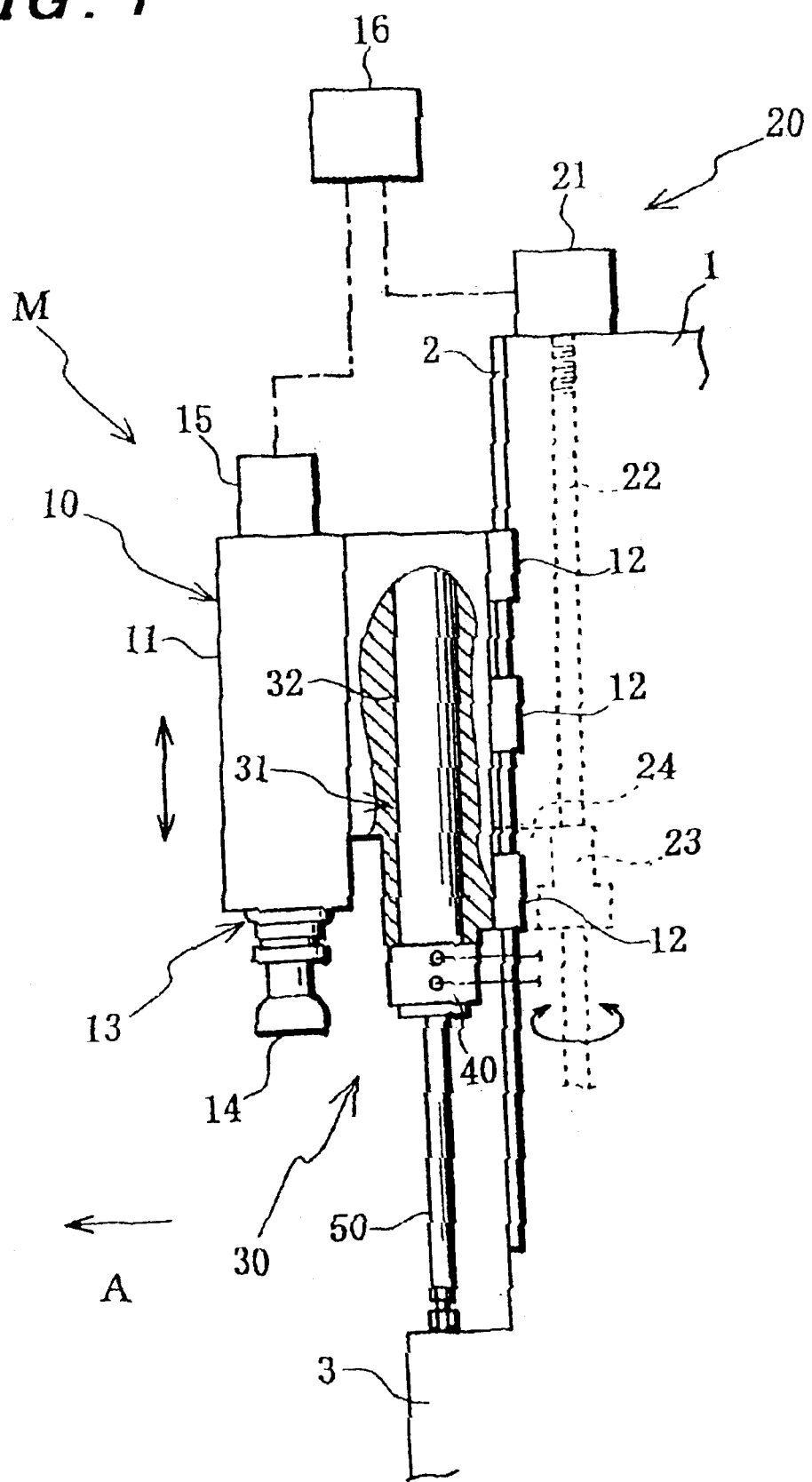
FIG. 1, is a side view of a machine tool containing a main shaft balancing device relating to an embodiment of the present invention.

The present embodiment is one example of the present invention being used in a machine tool such as an upright machining center or the like. Referring to FIG. 1, the direction of arrow A will be described as forward.

First, a machine tool M is described briefly.

Referring to FIG. 1, machine tool M is equipped with a column 1, a main shaft unit 10 that is guided by column 1 to allow for vertical displacement, and a vertical displacement mechanism 20 for raising and lowering main shaft unit 10, and the like. A machine tool main shaft balancing device 30 (henceforth referred to as main shaft balancing device 30), which reduces the load on vertical displacement mechanism 20 by supporting main shaft unit 10 and which contains a gas spring 31, is provided on machine tool M.

At least one pair of left and right vertical guide rails 2 is provided on the front end of column 1. A plurality of sliders 12, which are affixed to the back end of a frame member 11 of main shaft unit 10, slidably engage with guide rails 2. At the lower end of guide rails 2, a catching part 3 that contacts the lower end of a rod 50 of gas spring 31 is provided on column 1.

Main shaft unit 10 comprises frame member 11, a main shaft 13, and an electric motor 15 for rotating main shaft 13. Main shaft 13 is supported at the front of frame member 11 in a manner allowing for rotation around a vertical axis. Main shaft 13 is used for detachably attaching a tool 14 to its lower end. Electric motor 15 is attached to the upper side of the front part of frame member 11 and is directly connected to main shaft 13. Electric motor 15 is electrically connected to a control device 16. Electric motor 15 is driven by control device 16, and tool 14 together with main shaft 13 is rotated.

Vertical displacement mechanism 20 comprises: an electric motor 21 that is attached to the upper end of column 1; a vertical ball screw shaft 22 that is directly connected to electric motor 21 and extends downward; and a ball screw nut 23 that screws onto ball screw shaft 22 and is connected to main shaft unit 10 via a connecting portion 24. Electric motor 21 is electrically connected to control device 16. Electric motor 21 is driven by control device 16. When ball screw shaft 22 is rotated, main shaft unit 10 is raised and lowered together with ball screw nut 23.

Next, main shaft balancing device 30 is described in detail.

Figure 2:
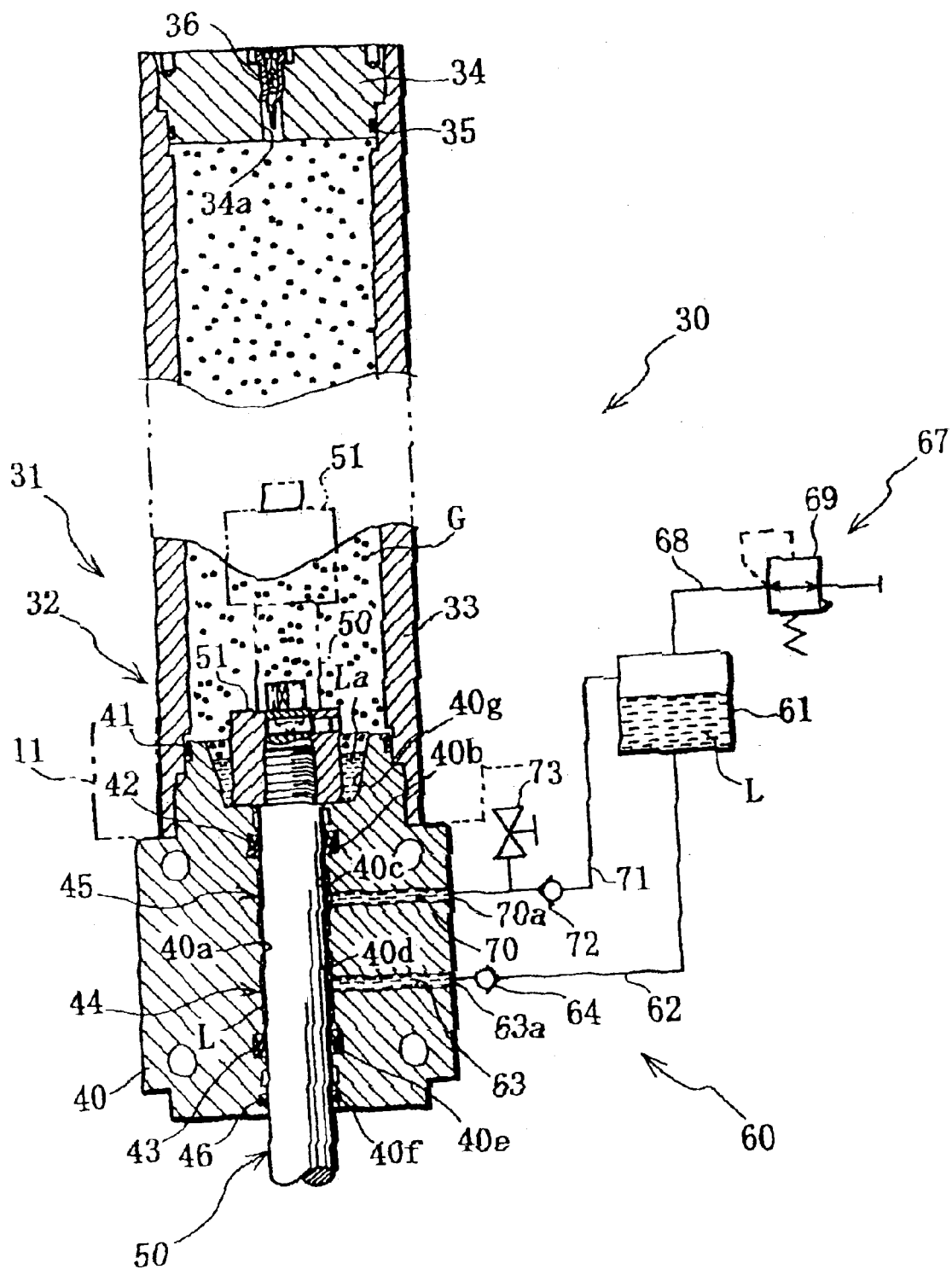
FIG. 2, is a longitudinal section of the principal parts of the main shaft balancing device.

Referring to FIGS. 1 and 2, with main shaft balancing device 30, gas spring 31 is provided upright. Main shaft unit 10 is supported by gas spring 31, and the load on vertical displacement mechanism 20, which raises and lowers main shaft unit 10, is reduced.

Gas spring 31 comprises a cylinder body 32 which is filled with a compressed gas G (compressed nitrogen gas for example) of a gas pressure P1 (P1=7 Mpa for example), and a rod 50 which passes through a rod end wall member 40 of cylinder body 32. Cylinder body 32 is affixed to and passes vertically through main shaft unit 10. Cylinder body 32 is placed in an inverted manner so that rod 50 extends downward from cylinder body 32. W (impelling force of the gas spring) approximately equals P1×A (cross-sectional area of rod 50). Gas pressure P1 of compressed gas G inside cylinder body 32 and cross-sectional area A of rod 50 are set so that the impelling force W of the gas spring approximates the weight of main shaft unit 10.

Referring to FIG. 2, cylinder body 32 comprises: a sleeve member 33 which fits inside unit frame 11 of main shaft unit 10; a head side end wall member 34 and rod side end wall member 40 which hermetically seal off the upper end and lower end of sleeve member 33. Head end wall member 34 fits inside and screws onto the upper end of sleeve member 33 via an O-ring 35. The upper end of rod end wall member 40 fits inside and screws onto the lower end of sleeve member 33 via an O-ring 41.

Near the axis center of head end wall member 34, a vertical through hole 34a is formed. A gas filling nozzle with a check valve 36 is embedded in an airtight manner into through hole 34a. The interior of cylinder body 32 is filled with compressed gas G via check valve 36. Approximately ¼ from the top of rod end wall member 40 fits inside cylinder member 33. The remaining approximately ¾ that is positioned below cylinder member 33 protrudes outward from the outer perimeter of cylinder member 33. This protruding part contacts unit frame 11 of main shaft unit 10 from below and is affixed by a plurality of bolts (not shown in the figure).

On rod end wall member 40, a rod passage hole 40a through which rod 50 slidably passes in an airtight manner is formed. A pair of upper and lower ring-shaped seal members 42, 43 which form a seal between rod end wall member 40 and rod 50 is provided in the interior of rod end wall member 40. Between ring-shaped seal members 42, 43, a ring-shaped first oil filling chamber 44 and a second oil filling chamber 45 are formed between rod end wall member 40 and rod 50.

A plurality of ring-shaped recesses 40b–40f is formed on the part of rod side end wall member 40 that faces rod passage hole 40a. Ring-shaped seal members 42, 43 are attached to ring-shaped recesses 40b, 40e, which are near the upper end and lower end of rod end wall member 40. A dust seal 46 is also attached to ring-shaped recess 40f, which is below ring-shaped recess 40e. Ring-shaped recesses 40d, 40c, which are between ring-shaped recesses 40b, 40e, construct one section of first oil filling chamber 44 and second oil filling chamber 45, respectively. First and second oil filling chambers 44, 45 are constructed slightly long in the axial direction. They are constructed so that the seal quality and lubrication quality are improved by lubrication oil L filled in oil filling chambers 44, 45.

Furthermore, an oil path 63 that extends from first oil filling chamber 44 to a supply port 63a on the outer perimeter of rod end wall member 40 and a discharge path 70 that extends from second oil filling chamber 45 to discharge port 70a on the outer perimeter are formed inside rod end wall member 40. Oil path 63 is connected via supply port 63a to an oil path 62 which is constructed from a flexible hose member. Discharge path 70 is connected via discharge port 70a to a discharge path 71 which is constructed from a flexible hose member.

A nut member 51 fits outside and screws onto the upper end of rod 50. Nut member 51 has a larger diameter than rod passage hole 40a and functions to prevent rod 50 from going through. Nut member 51 has a smaller diameter than the inner diameter of cylinder member 33, and gas spring 31 is a rod type of gas spring. In other words, with respect to the up and down stroke of main shaft unit 10 (extension and contraction stroke of rod 50), the amount of volume fluctuation of compressed gas G inside cylinder body 32 is made smaller to have a smaller amount of gas pressure fluctuation. As a result, an upward force that is approximately the same as the weight of main shaft unit 10 is always generated against main shaft unit 10 by gas spring 31, and main shaft unit 10 is effectively supported.

At the bottom of the inside of cylinder body 32, an oil filling recess 40g is formed at the top end of rod end wall member 40. Oil filling recess 40g is filled with a lubricating oil La for sealing compressed gas G. Oil filling recess 40g is formed in a funnel shape. Its lower surface is formed having a larger diameter than nut member 51. When nut member 51 contacts the lower surface of oil filling recess 40g, rod 50 is at its maximal protrusion.

Main shaft balancing device 30 is provided with an oil filling mechanism 60 which fills first oil filling chamber 44 as well as second oil filling chamber 45 via first oil filling chamber 44 with lubrication oil L. This oil filling mechanism 60 is equipped with a sealed oil tank 61 which stores lubrication oil L, oil path 62 and oil path 63 which connect oil tank 61 to first oil filling chamber 44, and a pressurizing mechanism 67 which pressurizes lubrication oil L inside oil tank 61 via compressed air. Main shaft unit 10 can be raised and lowered while having oil tank 61 connected to first oil filling chamber 44 via oil paths 62, 63. Oil path 62 is provided with a check valve 64 which prevents the back flow of lubrication oil L from first oil filling chamber 44 to oil tank 61 via oil paths 62, 63.

Pressurizing mechanism 67 comprises: a compressed air supply source (not shown) which supplies compressed air; an air path 68 which connects the compressed air supply source to oil tank 61; and a regulator 69 which is provided on air path 68 and depressurizes the air pressure from the pressurized air supply source. The upper layer part of oil tank 61 above lubrication oil L is filled with pressurized air depressurized to an air pressure P2 (for example P2=0.5 MPa) via regulator 69. Lubrication oil L is pressurized inside oil tank 61 by this pressurized air.

In addition, on main shaft balancing device 30, discharge path 70 and discharge path 71 for the discharge of gas inside second oil filling chamber 45 are provided connected to second oil filling chamber 45. Lubrication oil L discharged from second oil filling chamber 45 circulates back to oil tank 61 passing through discharge paths 70, 71. Discharge path 71 extending from discharge port 70a is connected to the upper layer part of oil tank 61 above lubrication oil L. A check valve 72 is provided on discharge path 71, and the inflow of lubrication oil L and compressed air from oil tank 61 to second oil filling chamber 45 via discharge paths 70, 71 is prevented.

An opening/closing valve 73 is connected to discharge path 71. When oil filling chambers 44, 45 is filled with lubrication oil L by oil filling mechanism 60 from a condition in which there is no lubrication oil L in oil filling chambers 44, 45, opening/closing valve 73 is opened, and air from inside oil filling chambers 44, 45 and oil paths 62, 63 and discharge paths 70, 71 is released to the outside.

The action and advantages of main shaft balancing device 30 is described.

By having the upright gas spring 31 which is filled with compressed gas G, main shaft unit 10 is supported while maintaining freedom in the vertical displacement of main shaft unit 10. Due to gas spring 31, an upward force approximately equal to the weight of main shaft unit 10 can be generated. As a result, the load on vertical displacement mechanism 20 is reduced.

When main shaft unit 10 is lowered by vertical displacement mechanism 20, cylinder body 32 of gas spring 31 is also lowered together with main shaft unit 10. As a result, rod 50 recedes (contracts) with respect to cylinder body 32.

Furthermore, when main shaft unit 10 is raised by vertical displacement mechanism 20, cylinder body 32 of gas spring 31 also rises together with main shaft unit 10. As a result, rod 50 is extended with respect to cylinder body 32.

In this manner, cylinder body 32 of gas spring 31 is raised and lowered together with main shaft unit 10 by vertical displacement mechanism 20, and rod 50 is extended or contracted with respect to cylinder body 32. Because gas spring 31 is a rod type gas spring in which rod 50 has a smaller diameter than the inner diameter of cylinder body 32, with respect to the up and down stroke of main shaft unit 10 (the extension and contraction stroke of rod 50), the amount of volume fluctuation of compressed gas G of cylinder body 32 is reduced, and the gas pressure fluctuation amount is reduced. Because of this, when main shaft unit 10 is stationary as well as when main shaft unit is raised or lowered, an upward force approximately equal to the weight of main shaft unit 10 is generated by gas spring 31, and main shaft unit 10 is supported effectively. The load on vertical displacement mechanism 20 is reliably and effectively lightened.

As a result of the lightening of the load on vertical displacement mechanism 20, the vertical displacement speed of main shaft unit 10 can be made even faster. Furthermore, because the load on vertical displacement mechanism 20 is lightened, vertical displacement mechanism 20 can be made smaller. In addition, because it is only a simple structure of having an upright gas spring 31, this is extremely advantageous in terms of manufacturing costs.

With main shaft balancing device 30, in the interior of rod end wall member 40, the pair of upper and lower ring-shaped seal members 42, 43 for sealing between rod end wall member 40 and rod 50 are provided. Ring-shaped oil filling chambers 44, 45 are formed between rod end wall member 40 and rod 50 in between these ring-shaped seal members 42, 43. Oil filling mechanism 60 is used to fill oil filling chambers 44, 45 with lubrication oil L. In other words, by having lubrication oil L which fills the pair of ring-shaped seal members 42, 43 and oil filling chambers 44, 45 and by constructing first and second oil filling chambers 44, 45 so that they are somewhat long in the axial direction, the sealing quality between rod end wall member 40 of cylinder body 32 and rod 50 is dramatically improved.

On the surface of rod 50, there may be polishing scratches or scratches formed due to foreign objects or embedded foreign objects. Even in these situations, because of the pair of upper and lower ring-shaped seal members 42, 43, there is a double seal in the axial direction between rod end wall member 40 and rod 50. Furthermore, by the sealing effect of lubrication oil that is filled in oil filling chambers 44, 45 in between the pair of ring-shaped members 42, 43, even if the scratches or foreign objects coincide in position with ring-shaped seal members 42, 43, leakage of compressed gas G inside cylinder body 32 to the outside via the spaces formed by these scratches or foreign objects is prevented.

Furthermore, due to lubrication oil L filled in oil filling chambers 44, 45, there is good lubrication of the sliding parts of rod end wall member 40 with ring-shaped seal members 42, 43 and rod 50. As a result, the durability of these members 42, 43 is improved, and leakage of compressed gas G is prevented to the utmost. In this manner, the durability of rod 50, ring-shaped seal members 42, 43 is improved, and leakage of compressed gas G inside cylinder body 32 is effectively suppressed.

Oil filling mechanism 60 comprises oil tank 61 which stores lubrication oil L, and oil paths 62, 63 which connects oil tank 61 to first oil filling chamber 44. Therefore, lubrication oil L is reliably filled into oil filling chambers 44, 45. The construction allows for the vertical displacement of main shaft unit 10 while oil tank 61 is connected to first oil filling chamber 41 via oil paths 62, 63. By doing so, the cumbersome task of filling of lubrication oil is simplified, and oil filling chambers 44, 45 is always filled with lubrication oil L. As a result, the sealing and lubricating functions of lubrication oil L of oil filling chambers 44, 45 can be reliably achieved.

Oil filling mechanism 60 has pressurizing mechanism 67 which pressurizes lubrication oil L inside oil tank 61 via compressed air. As a result, lubrication oil inside oil tank 61 is pressurized by pressurizing mechanism 67 via compressed air, and this pressurized lubrication oil L is supplied to oil filling chambers 44, 45 via oil paths 62, 63. Because discharge paths 70, 71, which is for discharging gas inside second oil filling chamber 45, are provided connected to second oil filling chamber 45, gas leaking into second oil filling chamber 45 from cylinder body 32 can also be discharged to oil tank 61 from discharge paths 70, 71. As a result, oil filling chambers 44, 45 are reliably filled with lubrication oil L.

Lubrication oil L discharged from second oil filling chamber 45 passes through discharge paths 70, 71 to return to oil tank 61. As a result, lubrication oil L flowing back to oil tank 61 can be reused. Furthermore, lubrication oil L of the amount discharged from oil filling chambers 44, 45 can be automatically supplied from oil tank 61 to oil filling chambers 44, 45 via oil paths 62, 63. However, because discharge path 71 is connected to sealed oil tank 61 in which compressed air from pressurizing mechanism 67 is stored, unnecessary flow of lubrication oil L of oil filling chambers 44, 45 to oil tank 61 is prevented.

Cylinder body 32 is affixed to main shaft unit 10, and cylinder body 32 is inverted with rod 50 extending downward from cylinder body 32. As a result, the bottom part inside cylinder body 32 can be filled with lubrication oil La for sealing compressed gas G. In other words, by having lubrication oil La, leaking of compressed gas G from between rod end wall member 40 of cylinder body 32 and rod 50 is suppressed with even greater reliability. The sliding parts between rod end wall member 40 and rod 50 are lubricated, and gas leakage resulting from their abrasion is also prevented.

Modifications of the above embodiment are described.

Elements that are fundamentally the same as in the above embodiment are given the same numerals. Descriptions other than that of the modified elements are omitted.

Figure 3:
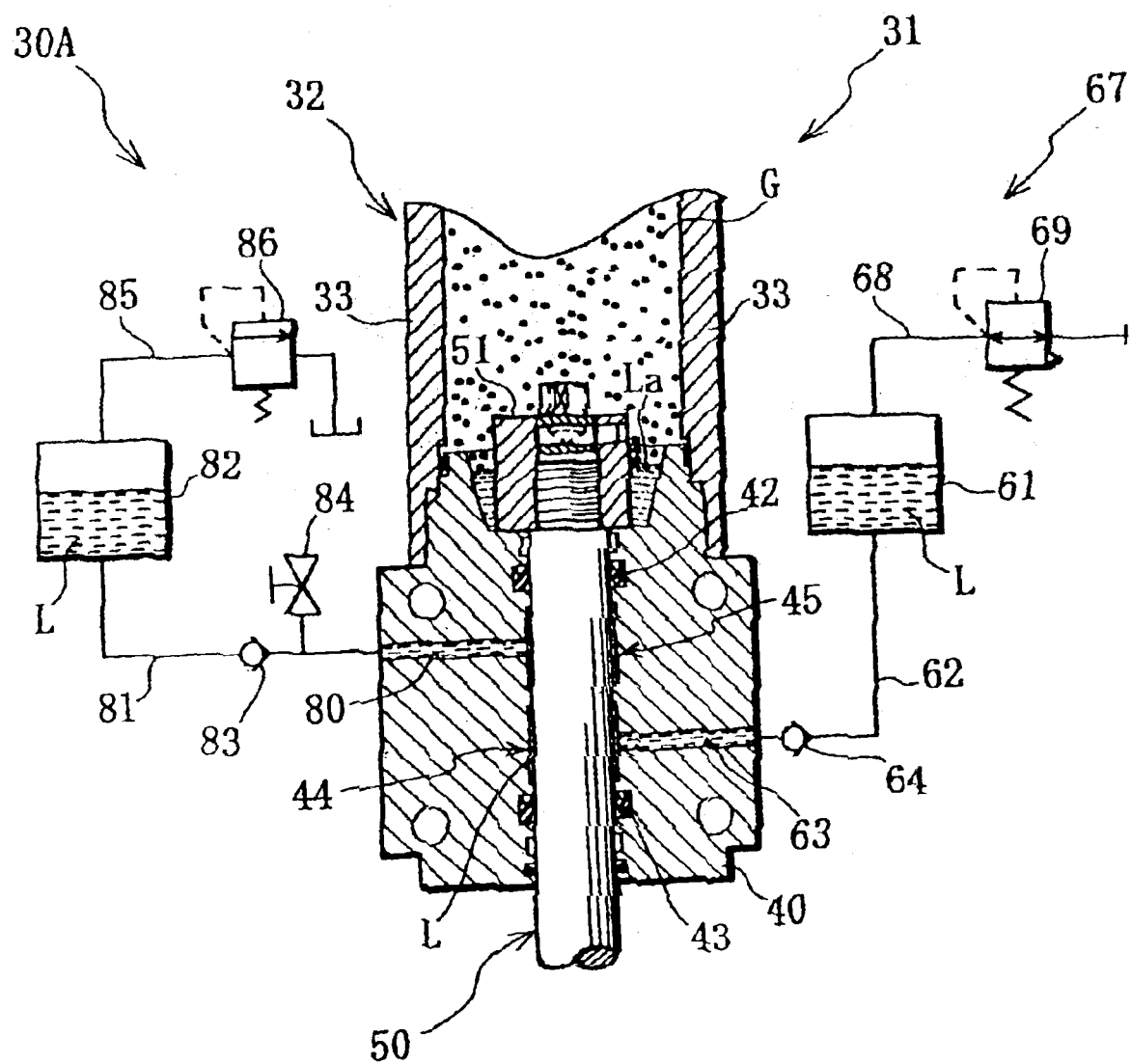
FIG. 3, is a longitudinal section of the principal parts of a main shaft balancing device relating to a first modification.

1) With main shaft balancing device 30A of FIG. 3, discharge paths 80, 81 are connected to second oil filling chamber 45 of gas spring 31 and are for discharging gas from inside second oil filling chamber 45. A discharge tank 82 stores lubrication oil L discharged from second oil filling chamber 45 and passed through discharge paths 80, 81. Discharge path 80 has a check valve 83, and an opening/closing valve 84 is connected to discharge path 80. Discharge tank 82 is constructed in a sealed condition. A gas path 85 is connected to the upper layer above lubrication oil L of discharge tank 82. A relief valve 86 which is activated at a gas pressure P3 (P3=0.8 MPa, for example) is provided on gas path 85.

With main shaft balancing device 30A, gas inside second oil filling chamber 45 is discharged from discharge paths 80, 81, and lubrication oil L is filled in oil filling chambers 44, 45 with reliability. Lubrication oil discharged from oil filling chambers 44, 45 and passed through discharge paths 80, 81 is stored in discharge tank 82. Lubrication oil L in the amount discharged is automatically supplied from oil tank 61 to oil filling chambers 44, 45 via oil paths 62, 63. Lubrication oil L stored in discharge tank 82 can also be reused.

Due to the gas and lubrication oil L discharged into discharge tank 82, the gas pressure inside discharge tank 82 is pressurized to a maximum pressure P3 at which relief valve 86 is activated. When the gas pressure inside discharge tank 82 is at approximately the maximum pressure, unnecessary discharge of the lubrication oil inside oil filling chambers 44, 45 into discharge tank 82 is prevented.

Figure 4:
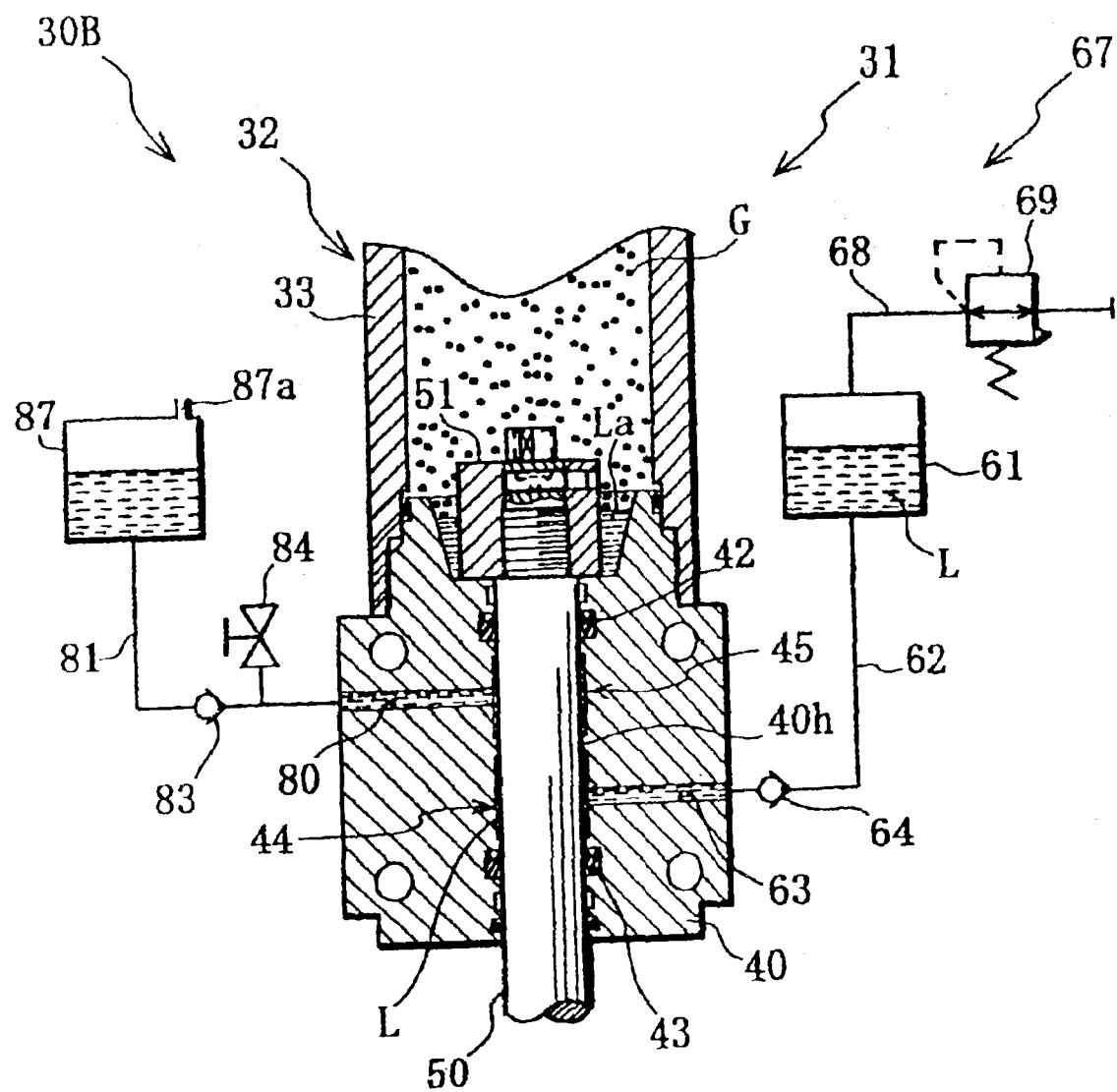
FIG. 4, is a longitudinal section of the principal parts of a main shaft balancing device relating to a second modification.

2) With main shaft balancing device 30B of FIG. 4, gas path 85 and relief valve 86 of main shaft balancing device 30A of FIG. 3 are omitted. In addition, instead of discharge tank 82, a discharge tank 87, which has a gas discharge opening 87a and is open to the atmosphere, is provided. Even if lubrication oil L inside discharge tank 87 is not pressurized by compressed gas, in order to prevent the unnecessary discharge of lubrication oil inside oil filling chambers 44, 45 into discharge tank 87, the restricting resistance due to a partition 40h which partitions first and second oil filling chambers 44, 45 can be made larger. Furthermore, although it is not shown in the figure, a restrictor valve can be provided separately on discharge paths 80, 81.

Figure 5:
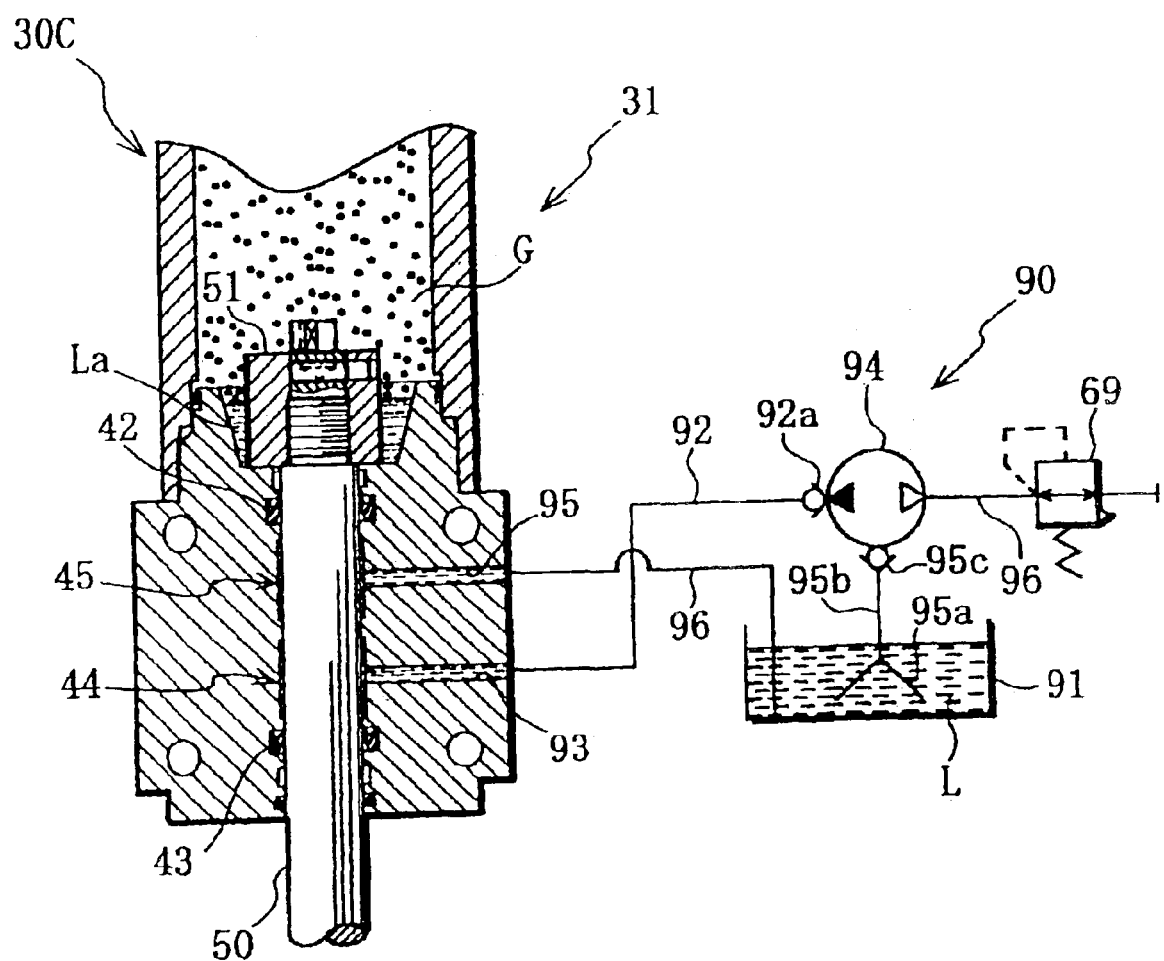
FIG. 5, is a longitudinal section of the principal parts of a main shaft balancing device relating to a third modification.

3) With main shaft balancing device 30C of FIG. 5, oil filling mechanism 90, which fills oil filling chambers 44, 45 with lubrication oil L, comprises: an oil tank 91, oil paths 92, 93, and a hydraulic pump 94 which pressurizes lubrication oil L inside oil tank 91 and supplies it to oil filling chambers 44, 45 via oil paths 92, 93. A check valve 92a is provided on oil path 92. Discharge paths 95, 96 are connected to second oil filling chamber 45 and are for discharging lubrication oil L and gas of oil filling chambers 44, 45 into oil tank 91.

Oil tank 91 is a tank which is open to the atmosphere. From oil tank 91, lubrication oil L is taken to hydraulic pump 94 via a filter 95a, oil path 95b, and check valve 95c. Compressed air which drives hydraulic pump 94 is supplied to hydraulic pump 94 after being depressurized by a regulator 97 which is provided on an air path 96 which extends from a compressed air supply source (not shown in the figure). The restriction resistance from partition 40 which partitions first and second oil filling chambers 44, 45 is small.

According to main shaft balancing device 30C, lubrication oil L inside oil tank 91 is pressurized and supplied to oil filling chambers 44, 45 by hydraulic pump 94. Lubrication oil L of the amount supplied to oil filling chambers 44, 45 is discharged and circulated to oil tank 91 from oil filling chambers 44, 45 via discharge paths 95, 96. In other words, lubrication oil L is forcibly circulated by hydraulic pump 94. As a result, the cooling capability by lubrication oil L of cooling gas spring 31 is improved. By discharging the gas inside oil filling chamber 45 from discharge path 95, 96, lubrication oil is reliably filled in oil filling chambers 44, 45.

Figure 6:
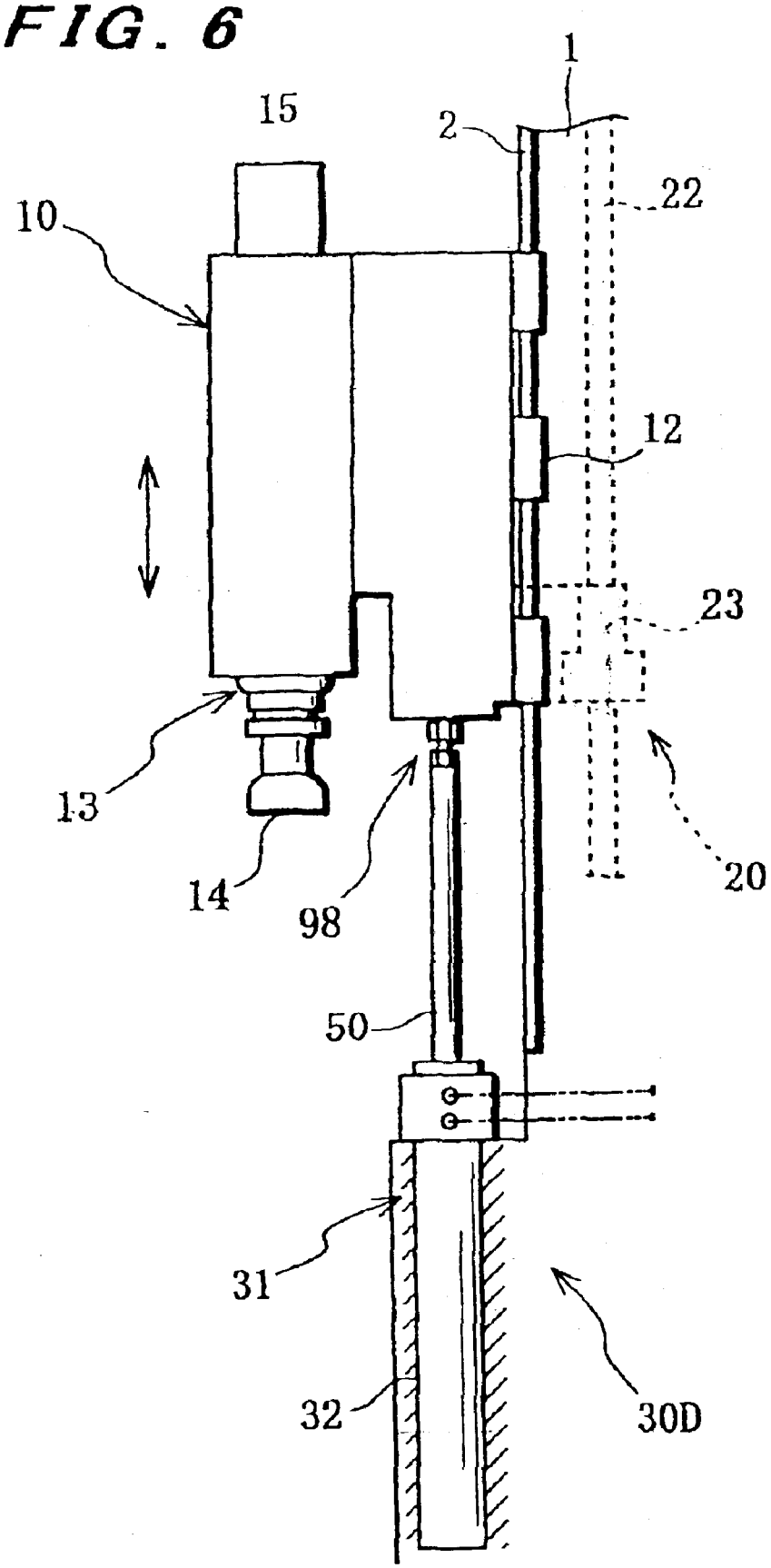
FIG. 6, is a side view of a machine tool containing a main shaft balancing device relating to a fourth modification.

4) With main shaft balancing device 30D of FIG. 6, cylinder body 32 of gas spring 31 is fixedly inserted into column 1 underneath the back part of main shaft unit 10. Rod 50 is placed extending upward from cylinder body 32. The upper end of rod 50 contacts and is stopped by the lower end surface of the back part of main shaft unit 10. There is a length adjusting mechanism 98 on the end portion of rod 50.

With main shaft balancing device 30D, when main shaft unit 10 is lowered by vertical displacement mechanism 20, rod 50 of gas spring 31 is also lowered and recedes together with main shaft unit 10. Furthermore, when main shaft unit 10 is raised by vertical displacement mechanism 20, cylinder body 32 of gas spring 31 is also raised and extended. Fundamentally, similar action and advantages are achieved as with main shaft balancing device 30 as described above.

5) The number and attachment sites of the gas cylinder of the main shaft balancing device is not limited to the above embodiments. For example, two or more gas cylinders can be placed in parallel in an upright position. For example, if cylinder body 32 can be affixed to main shaft unit 10 or column 1, they do not have to be inserted into these. Furthermore, for example, one or a plurality of gas cylinders can be placed along ball screw shaft 22 to support main shaft unit 10.

6) Instead of rod-type gas spring 31, a piston type gas spring can also be used. A piston, which is connected to rod 50, is inserted inside cylinder body 32 in a manner allowing for airtight sliding motion.

A reader should understand that main shaft balancing devices 30, 30A–30D described above are only examples of the present invention. Various modifications may be effected without departing from the scope or spirit of the invention. Furthermore, the present invention is not limited to the above machine tool M, and the present invention can be used in various machine tools that have a main shaft unit and a vertical displacement mechanism that raises and lowers this main shaft unit.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the spirit and scope of this invention as defined in the following claims.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies entirely on friction between a wooden part and a cylindrical surface, a screw's helical surface positively engages the wooden part, and a bolt's head and nut compress opposite sides of at least one wooden part, in the environment of fastening wooden parts, a nail, a screw, and a bolt may be readily understood by those skilled in the art as equivalent structures.

What is claimed is:

1. A main shaft balancing device for a machine tool in which a main shaft unit has a main shaft for attaching a tool and an electric motor for rotating said main shaft and is raised and lowered by vertical displacement means, comprising:

a gas spring comprising a cylinder body filled with compressed gas and a rod that passes through a rod side end wall member of said cylinder body;

said gas spring, which supports said main shaft unit and lightens the load on said vertical displacement means, being provided in a vertical position;

a pair of upper and lower ring-shaped seal members, which seal between said rod side end wall member and said rod, provided in the interior of said rod side end wall member;

a ring-shaped oil filling chamber formed between said ring-shaped seal members and between said rod side end wall member and said rod;

an oil filling means filling said oil filling chamber with lubrication oil;

wherein said oil filling means comprises an oil tank for storing lubrication oil and an oil path that connects said oil tank to said oil filling chamber;

wherein said oil filling means has a pressurizing means for pressurizing said lubrication oil inside said oil tank;

wherein a discharge path, which is connected to said oil filling chamber and is for discharging of gas inside said oil filling chamber, is provided; and wherein the lubrication oil discharged from said oil filling chamber passes through said discharge path and flows back to said oil tank.

2. A main shaft balancing device for a machine tool in which a main shaft unit has a main shaft for attaching a tool and an electric motor for rotating said main shaft and is raised and lowered by vertical displacement means, comprising:

a gas spring comprising a cylinder body filled with compressed gas and a rod that passes through a rod side end wall member of said cylinder body;

said gas spring, which supports said main shaft unit and lightens the load on said vertical displacement means, being provided in a vertical position;

a pair of upper and lower ring-shaped seal members, which seal between said rod side end wall member and said rod, provided in the interior of said rod side end wall member;

a ring-shaped oil filling chamber formed between said ring-shaped seal members and between said rod side end wall member and said rod;

an oil filling means filling said oil filling chamber with lubrication oil;

wherein said oil filling means comprises an oil tank for storing lubrication oil and an oil path that connects said oil tank to said oil filling chamber;

wherein said oil filling means has a pressurizing means for pressurizing said lubrication oil inside said oil tank via compressed air;

wherein a discharge path, which is connected to said oil filling chamber and is for discharging of gas inside said oil filling chamber, is provided, and wherein a discharge tank, which is for storing lubrication oil that is discharged from said oil filling chamber and passes through said discharge path, is provided.

3. A main shaft balancing device for a machine tool as described in claim 1, wherein:

said oil filling means has a hydraulic pump that pressurizes said lubrication oil inside said oil tank and supplies said lubrication oil to said oil filling chamber.

4. A main shaft balancing device for a machine tool, according to claim 1 wherein:

said cylinder body is affixed to said main shaft unit;

said rod extends downward from said cylinder body.

5. A main shaft balancing device for a machine tool, according to claim 4, wherein:

a lower part inside said cylinder body is filled with lubrication oil for sealing of compressed gas.

6. A main shaft balancing device for a machine tool, according to claim 2 wherein:

said cylinder body is affixed to said main shaft unit;

said rod extends downward from said cylinder body.

7. A main shaft balancing device for a machine tool, according to claim 6, wherein:

a lower part inside said cylinder body is filled with lubrication oil for sealing of compressed gas.

* * * * *